United States Patent [19]

Kramer

[11] Patent Number: 5,111,138
[45] Date of Patent: May 5, 1992

[54] SPEED SENSOR HAVING A CLOSED MAGNETIC FLUX PATH FOR SENSING SPEED FROM AN AXIAL FACE OF A ROTATING MEMBER

[75] Inventor: Dennis A. Kramer, Troy, Mich.

[73] Assignee: Rockwell International Corporation, Pittsburgh, Pa.

[21] Appl. No.: 732,252

[22] Filed: Jul. 18, 1991

Related U.S. Application Data

[63] Continuation of Ser. No. 523,694, May 15, 1990, abandoned.

[51] Int. Cl.$^5$ .............................................. G01P 3/488
[52] U.S. Cl. ..................................... 324/174; 310/168
[58] Field of Search ............... 324/173, 174, 207.15, 324/207.16, 207.17, 207.25; 73/517 R, 518, 519; 310/155, 168, 68 B

[56] References Cited

U.S. PATENT DOCUMENTS

| | | | |
|---|---|---|---|
| 2,304,866 | 12/1942 | Wall | 310/155 |
| 3,230,407 | 1/1966 | Marsh | 310/168 |
| 3,619,678 | 11/1971 | Ruof | 310/168 X |
| 3,939,416 | 2/1976 | Maskery | 324/174 |

FOREIGN PATENT DOCUMENTS 1088106 10/1967 United Kingdom ............... 324/174

OTHER PUBLICATIONS

Nemier et al., Transducer Pickup, IBM Technical Disclosure Bulletin, vol. 19, No. 4, Sep. 1976, pp. 1197, 1198.

Primary Examiner—Gerard R. Strecker

[57] ABSTRACT

Speed sensor utilizing a stator which includes two circumferentially spaced elements which are interconnected by a low magnetic permeability member. The elements have alternating regions which provide a variation in magnetic permeability. A rotor which is arranged for rotation about a rotational axes includes alternating regions of magnetic permeability which interact with the stator. A magnet is located between the elements of the stator and the structural interconnection therebetween. A coil of wire is placed around the structural interconnecting member to sense variations in magnetic field which are caused by the change in reluctance as the respective regions of magnetic permeability of the elements and rotor pass one another.

4 Claims, 1 Drawing Sheet

SPEED SENSOR HAVING A CLOSED MAGNETIC FLUX PATH FOR SENSING SPEED FROM AN AXIAL FACE OF A ROTATING MEMBER

BACKGROUND OF THE INVENTION

This application is a continuation of co-pending application Ser. No. 07/523,694, filed May 15, 1990, now abandoned.

FIELD OF THE INVENTION

This invention relates generally to rotational speed sensors; and more particularly to rotational speed sensors which provide a closed magnetic flux path for sensing speed from an axial face of a rotating member.

DESCRIPTION OF THE RELATED ART

Speed sensors are used in many control and indicating systems. For example, the sensor described and claimed in co-pending U.S. application Ser. No. 07/463,736, filed Jan. 12, 1990. Prior art systems include several examples which feature variable reluctance type speed sensing. A commercially successful embodiment of this technology includes a toothed wheel which passes by a winding placed on a core. This is commonly referred to as a pencil type sensor. The magnetic field provided by the core of the pencil sensor varies as the spacing between the core of the sensor and the structure of the wheel varies. A pencil sensor features an open magnetic path. Therefore, the variation in reluctance in the magnetic path which results as a tooth passes the pencil sensor is not of sufficient magnitude to produce a robust signal. In addition, any magnetic particles which may be present in the environment are drawn to the sensor core and ultimately bridge the gap resulting in a failure of the pencil type sensor.

Therefore, there is a need for a sensor which features a closed magnetic flux path yet may be easily installed and removed for service.

SUMMARY OF INVENTION

The present speed sensor improves upon prior art speed sensors by utilizing a stator which features two circumferentially spaced elements which are interconnected by a high magnetic permeability member. The elements have alternating regions which provide a variation in magnetic permeability. A rotor which is arranged for rotation about a rotational axes includes alternating regions of magnetic permeability which interact with the stator. A magnet is located between the elements of the stator and the structural interconnection therebetween. A coil of wire is placed around the interconnecting member to sense variations in magnetic field which are caused by the change in reluctance as the respective regions of magnetic permeability on the elements pass opposing regions of alternating magnetic permeability on the rotor. The elements of the stator are both positioned along an axial face of the rotor.

These and other aspects of the present invention will become more readily apparent by reference to the following detailed description of the embodiments as shown in the drawings.

DESCRIPTION OF THE PREFERRED EMBODIMENT

Figure 1:
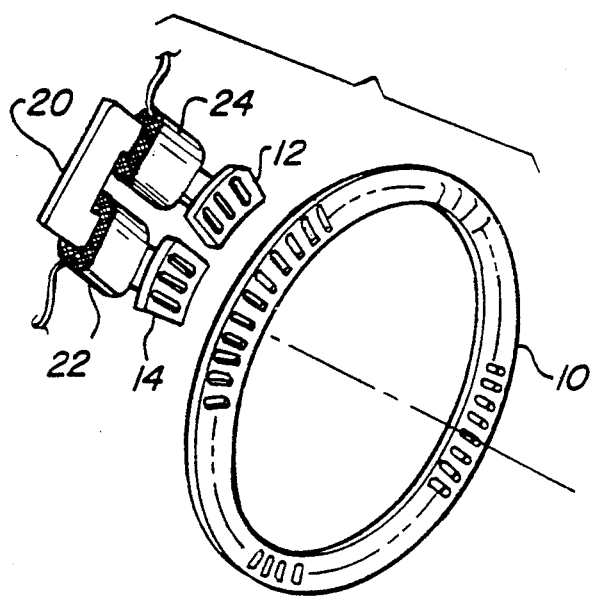
FIG. 1 is a perspective view of one embodiment of the present speed sensor, showing the sensor in exploded view.
Figure 2:
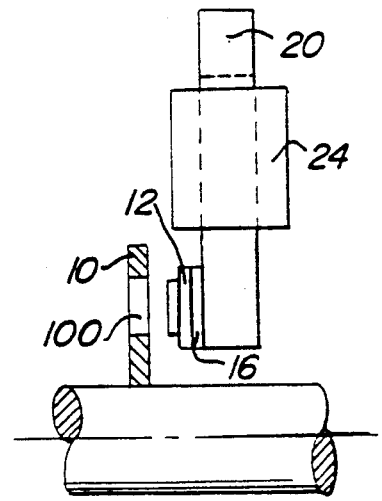
FIG. 2 is a side view of one embodiment of the present invention featuring a rotor having alternating regions of magnetic permeability formed by pierced openings.
Figure 3:
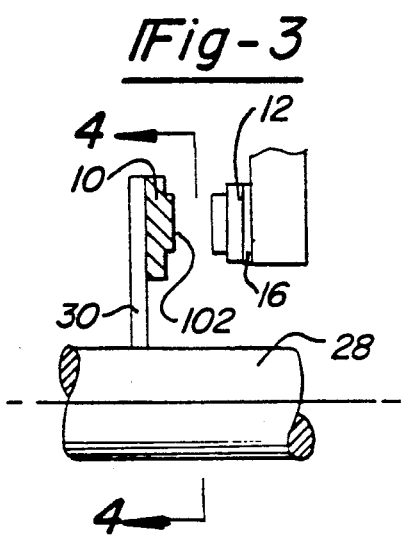
FIG. 3 is a second embodiment of the present invention featuring a rotor having teeth protruding from a base rotor structure.
Figure 4:
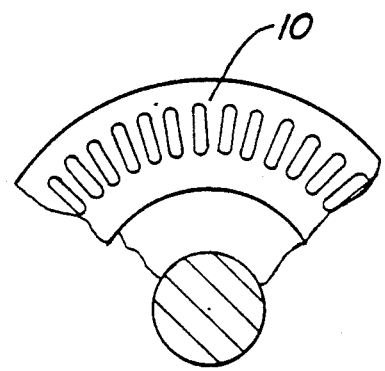
FIG. 4 is a partial side view of the a rotor.
Figure 5:
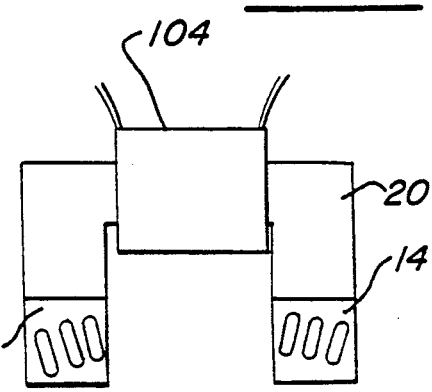
FIG. 5 is a side view of the stator featuring a single coil.

The annular speed sensor of the present invention incorporates a rotor 10; stator elements 12, 14; interconnecting structural member 20; and coils 22, 24 (as shown in exploded view in FIG. 1). Teeth formed in stator elements 12 and 14 provide a variable reluctance flux path between stator elements 12, 14 and rotor 10. Thus only a sector of the rotor encounters magnetic flux. The teeth formed in rotor 10 may be pierced openings 100 formed in a circular plate formed of high permeability magnetic material (i.e., low carbon steel) as shown in FIG. 2. Alternatively, the ferromagnetic teeth may be provided as raised members 102 formed on a circular plate formed of low magnetic permeability material as shown in FIG. 3. The teeth formed on stator elements 12, 14 are produced as raised members formed in an otherwise planar surface of a flat high magnetic permeability material. The stator elements 12, 14 are secured to the interconnecting structural member 20 with a magnet 16 disposed therebetween. (As shown in FIGS. 2 and 3.) This magnet produces flux which flows through the closed flux path defined by rotor 10, stator element 12, interconnecting structural member 20, stator element 14 and back through rotor 10 to the opposite pole of magnet 16. Paired magnets may be located between both stator elements 12, 14 and interconnecting structural member 20 as long as the magnetic orientation of the respective magnets provides appropriate flux cooperation. The teeth arranged on rotor 10 extend radially about rotor 10 as seen in FIG. 4. The sensor may utilize two coils as shown in FIG. 1 or a singular coil 104 as shown in FIG. 5. The magnitude of the speed signal generated by the sensor is a function of the number of turns placed in the varying magnet field which surrounds the interconnecting structural member 20. Space limitations permit a greater number of windings by use of two coils as shown in FIG. 1. The rotor 10 may be attached to shaft 28 by any suitable means which include that illustrated in FIG. 3 as hub 30.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A rotational speed sensor comprising:

a stator having two portions;

a first portion including two discrete elements which are circumferentially spaced along a circumference from one another and feature radially extending surfaces;

each said surface having alternating circumferentially spaced regions offering first and second magnitudes of magnetic permeability;

said stator having a second portion forming a high magnetic permeability structural interconnection between said surfaces of said discrete elements of said first portion;

a magnet disposed between at least one of said discrete elements and said second portion of said stator and providing structural interconnection therebetween;

a rotor arranged for rotation about a rotational axis and having alternating circumferentially spaced regions offering first and second magnitudes of magnetic permeability;

said alternating circumferentially spaced regions of first and second magnitudes of magnetic permeability of said rotor and stator being axially opposed and arranged in close proximity to one another;

said rotor, magnet and stator being arranged to form a magnetic flux path whereby a variation in magnetic flux indicative of the rotational speed of said rotor relative to said stator is produced in said magnetic flux path upon rotation of said rotor; and means for sensing variation in said flux disposed on said second portion of said stator.

2. A rotational speed sensor as claimed in claim 1 wherein said means for sensing variation in flux is a coil disposed about said second portion of said stator.

3. A rotational speed sensor as claimed in claim 1 wherein said stator and rotor have alternating circumferentially spaced regions offering first and second magnitudes of magnetic permeability include ferromagnetic teeth means.

4. A rotational speed sensor as claimed in claim 1 wherein said alternating circumferentially spaced regions offering first and second magnitudes of magnetic permeability comprise openings formed in said rotor and said stator.

* * * * *